(12) United States Patent
Stephenson

(10) Patent No.: US 6,570,633 B1
(45) Date of Patent: May 27, 2003

(54) MULTI-LAYER NEUTRAL DENSITY SHEET HAVING A PLURALITY OF LIGHT-MODULATING LAYERS WITH MEMORY PROPERTIES

(75) Inventor: Stanley W. Stephenson, Spencerport, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/337,312

(22) Filed: Jun. 21, 1999

(51) Int. Cl.⁷ .............................................. G02F 1/133
(52) U.S. Cl. ........................ 349/86; 349/77; 349/78
(58) Field of Search ................................ 349/77, 78, 86

(56) References Cited

U.S. PATENT DOCUMENTS

| | | | |
|---|---|---|---|
| 4,435,047 A | | 3/1984 | Fergason |
| 4,581,608 A | * | 4/1986 | Aftergut et al. ............. 349/170 |
| 5,200,845 A | * | 4/1993 | Crooker et al. ............. 349/175 |
| 5,223,959 A | | 6/1993 | Wu et al. |
| 5,437,811 A | | 8/1995 | Doane et al. |
| 5,463,482 A | * | 10/1995 | Jones ........................... 349/86 |
| 5,680,233 A | * | 10/1997 | Faris et al. .................... 349/61 |
| 5,847,798 A | | 12/1998 | Yang et al. |
| 5,940,150 A | * | 8/1999 | Faris et al. .................... 349/16 |
| 6,133,971 A | * | 10/2000 | Silverstein et al. ........... 349/86 |
| 6,166,800 A | * | 12/2000 | Silverstein et al. ......... 349/201 |
| 6,168,800 B1 | * | 12/2000 | Silverstein et al. ......... 349/201 |
| 6,317,189 B1 | * | 11/2001 | Yuan et al. ................. 349/176 |
| 6,320,631 B1 | * | 11/2001 | Okada et al. ................. 349/86 |

FOREIGN PATENT DOCUMENTS

WO 97/04398 2/1997

\* cited by examiner

*Primary Examiner*—Kenneth Parker
(74) *Attorney, Agent, or Firm*—Raymond L. Owens

(57) ABSTRACT

A multi-layer, neutral-density sheet with memory properties, includes a transparent substrate and a transparent, electrically conductive layer formed over the transparent substrate. The multi-layer sheet further includes a plurality of light modulating layers formed over the transparent electrically conductive layer, each light modulating layer being formed of polymer with a dispersion of cholesteric liquid crystal material having memory properties and selected so that in combination with cholesteric liquid crystal in other layers are controllable between a first, light reflecting neutral-density state and the second transparent state.

9 Claims, 4 Drawing Sheets

PLANER

FOCAL-CONIC

MULTI-LAYER NEUTRAL DENSITY SHEET HAVING A PLURALITY OF LIGHT-MODULATING LAYERS WITH MEMORY PROPERTIES

CROSS REFERENCE TO RELATED APPLICATIONS

Reference is made to commonly-assigned U.S. patent application Ser. No. 09/045,016 filed Mar. 20, 1998, entitled "Display Having Viewable and Conductive Images" by Stanley W. Stephenson now U.S. Pat. No. 6,267,697, U.S. patent application Ser. No. 09/146,656 filed Sep. 3, 1998, entitled "Reflective Sheet Display With Laser Patternable Coating", by Stephenson et al now U.S. Pat. No. 6,236,442, and U.S. patent application Ser. No. 09/336,931 filed concurrently herewith, entitled "A Sheet Having a Layer with Different Light Modulating Materials" by Stanley W. Stephenson now U.S. Pat. No. 6,359,673, the disclosures of which are incorporated herein.

FIELD OF THE INVENTION

The present invention relates to imaging sheets which can be used in displays that selectively transmit or reflect light.

BACKGROUND OF THE INVENTION

Currently, information is displayed using assembled sheets of paper carrying permanent inks or displayed on electronically modulated surfaces such as cathode ray displays or liquid crystal displays. Other sheet materials can carry magnetically writable areas to carry ticketing or financial information, however magnetically written data is not visible.

A structure is disclosed in PCT/WO 97/04398, entitled "Electronic Book With Multiple Display Pages" which is a thorough recitation of the art of thin, electronically written display technologies. Disclosed is the assembling of multiple display sheets that are bound into a "book", each sheet is arranged to be individually addressed. The patent recites prior art in forming thin, electronically written pages, including flexible sheets, image modulating material formed from a bi-stable liquid crystal system, and thin metallic conductor lines on each page.

Fabrication of flexible, electronically written display sheets are disclosed in U.S. Pat. No. 4,435,047. A first sheet has transparent indium-tin-oxide (ITO) conductive areas and a second sheet has electrically conductive inks printed on display areas. The sheets can be glass, but in practice have been formed of Mylar polyester. A dispersion of liquid crystal material in a binder is coated on the first sheet, and the second sheet is bonded to the liquid crystal material. Electrical potential applied to opposing conductive areas operate on the liquid crystal material to expose display areas. The display uses nematic liquid crystal materials which ceases to present an image when de-energized.

U.S. Pat. No. 5,223,959 discloses a plurality of polymer dispersed liquid crystal material, each having a different dye material of red, green or blue dye material. Differing electrical signals to common electrodes operate on each of the materials to control the state of each type of dyed liquid crystal material. The patent requires the use of conventional nematic liquid crystals with a dye to absorb light. The droplets are chemically treated to be stable in either a clear or a light absorbing state. The invention also requires materials having different response times to electrical signals. The device must be continually driven so that the human eye perceives complementary colors. This arrangement has the disadvantage of requiring continuous, high speed electrical drive because the materials do not maintain their state. The material must be driven to achieve a neutral color density.

U.S. Pat. No. 5,437,811 discloses a light modulating cell having a polymerically dispersed chiral nematic liquid crystal. The chiral nematic liquid crystal has the property of being driven between a planar state reflecting a specific visible wavelength of light and a light scattering focal-conic state. The structure has the capacity of maintaining one of the given states in the absence of an electric field.

U.S. Pat. No. 5,847,798 discloses a continuous tone, neutral density display which can be driven between a reflective and light absorbing state. The display use a single cholesteric material to provide a constant reflectance across the visible light spectrum to provide a neutral color. The material is reflective in the non-visible spectrum and appears clear in the visible spectrum. The display can also be driven in to a stable light scattering state that is uniformly scattering in the visible spectrum. A neutral "white" state occurs, but the provides a very low reflective intensity.

Currently, privacy windows are created using the scattering properties of conventional nematic liquid crystals. Such materials require continuous electrical drive to remain transparent.

SUMMARY OF THE INVENTION

It is an object of the present invention to provide a neutral density sheet with memory properties.

It is another object of the present invention to provide a neutral density sheet which permits continuous tone, neutral density images that are stable in a zero-field condition.

A still further object is to provide a sheet usable as a display that can be electronically written repeatedly.

These objects are achieved in a multi-layer, neutral-density sheet with memory properties, comprising
  (a) a transparent substrate;
  (b) a transparent, electrically conductive layer formed over the transparent substrate; and
  (c) a plurality of light modulating layers formed over the transparent electrically conductive layer, each light modulating layer being formed of polymer with a dispersion of cholesteric liquid crystal material having memory properties and selected so that in combination with cholesteric liquid crystal in other layers are controllable between a first, light reflecting neutral-density state and the second transparent state.

The present invention provides a neutral density privacy sheet that is stable in either a light blocking or light transmitting field in a zero state condition. The reflective characteristic of cholesteric materials provided in multiple layers generates a light reflection across the visible spectrum.

Sheets made in accordance with the present invention can be used to provide a re-writable image display sheet. The present invention uses a plurality of layers of cholesteric liquid crystal materials that are effective in at least two states, a reflective state and a transmissive state. This invention permits the use of light modulating, electrically responsive sheets with improved reflective efficiency. The sheet can be formed using inexpensive, efficient photographic layer methods. A single large volume of sheet material can be coated and formed into various types of sheets and cards. Displays in the form of sheets in accordance with the present invention are inexpensive, simple and fabricated using low-cost processes.

DETAILED DESCRIPTION OF THE PREFERRED EMBODIMENT

Figure 1A:
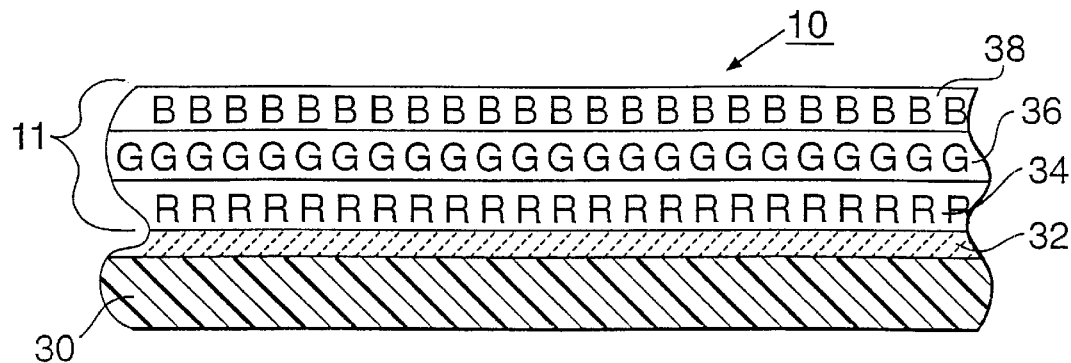
FIG. 1A is a sectional view of a sheet having multi-layers of liquid crystal in accordance with the present invention.

FIG. 1A is a sectional view of a sheet 10 used in the invention. The sheet 10 includes a substrate 30. Substrate 30 can be made of a transparent polymeric material, such as Kodak Estar film base formed of polyester plastic, and have a thickness of between 20 and 200 microns. For example, substrate 30 can be a 80 micron thick sheet of polyester. Other polymers, such as transparent polycarbonate, can also be used. An optically transparent, electrically conductive layer 32 is formed over the substrate 30. The transparent, electrically conductive layer 32 can be formed of tin-oxide or Indium-Tin-Oxide (ITO), with ITO being the preferred material. Typically, transparent, electrically conductive layer 32 is sputtered onto the substrate 30 to a resistance of less than 250 ohms per square.

Light modulating layers 11 are deposited over transparent, electrically conductive layer 32. The liquid crystal materials are chiral doped nematic liquid crystal, also known as cholesteric liquid crystals, dispersed in a polymeric binder. These types of liquid crystal molecules can align in a planar structure and the chirality of the molecules set to reflect a given wavelength of visible light.

Figure 2A:
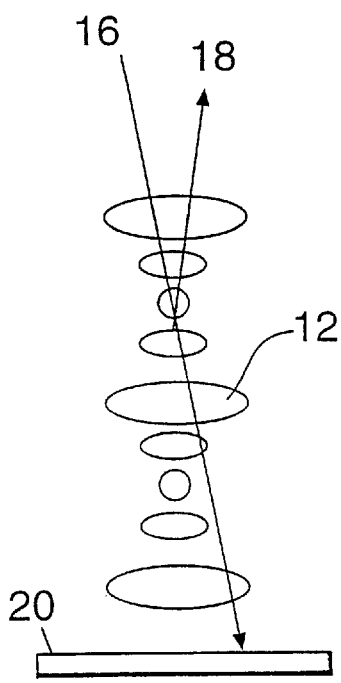
FIG. 2A is a view of the optical characteristics of a chiral nematic material in a planar state reflecting light.
Figure 2B:
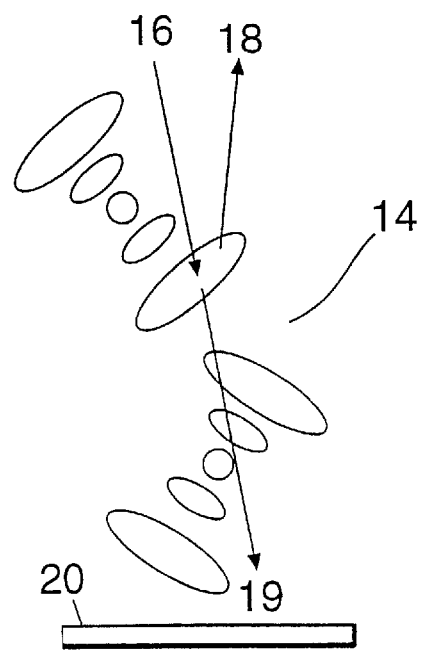
FIG. 2B is a view of the optical characteristics of a chiral nematic material in a focal-conic light diffusing state.

FIG. 2A, and FIG. 2B show states of cholesteric liquid crystals. In FIG. 2A, a high voltage field has been applied and quickly switched to zero potential, which causes the liquid crystal molecules to become planar liquid crystals 12. Incident light 16 can consist of red, green and blue fractions of light. The pitch of the molecules can be adjusted to create a Bragg diffraction of reflected light 18 comprised of light of a given color and polarity. In this example, the chirality of planar liquid crystals 12 is adjusted to reflect green light.

In FIG. 2B, application of a lower voltage field has caused molecules of the chiral nematic material to break into tilted cells that are known as the focal conic liquid crystals 14. The lower voltage field can progressively drive the molecules of the cholesteric material towards a transparent state. A light absorber 20 can be positioned on the side opposing the incident light 16. In the fully evolved focal-conic state, incident light 16 becomes absorbed light 19. Progressive evolution of the focal-conic state causes a viewer to perceive green light that transitions to black as the cholesteric material changes from a planar to a fully evolved focal-conic state. The transition to the light transmitting state is progressive, and varying the low voltage time permits a variable level of reflection. These variable levels can be mapped out to corresponding gray levels, and when the field is removed, light modulating layers 11 maintains a given optical state indefinitely. The states are more fully discussed in U.S. Pat. No. 5,437,811.

Chiral nematic materials are superior to undoped nematic crystals having incorporated dichroic dyes because chiral doped nematic materials maintain a given state between reflective to transparent states when the electrical drive field is removed. However, in a single layer configuration they operate on light having only one color. Returning to FIG. 1A, a plurality of polymer dispersed cholesteric materials are coated as red reflecting cholesteric 34, green reflecting cholesteric 36 and blue reflecting cholesteric 38 over transparent, electrically conductive layer 32. The concentration and layer thicknesses are adjusted to create a neutral density "white" reflective layer in the planar state. Because each layer is polymerically dispersed, multiple layers having separable chromatic reflectivity can be incorporated into a multilayer layer sharing a common drive field.

Red reflecting cholesteric 34, green reflecting cholesteric 36 and blue reflecting cholesteric 38 are dispersed in a polymeric binders such as a UV curable polymer, an epoxy, polyvinyl alcohol (PVA) or in this invention deionized photographic gelatin. The binder content can be between 5% and 30%. Compounds such as gelatin and PVA are machine coatable on equipment associated with photographic films. It is important that the binder have a low ionic content. The presence of ions in such a binder hinders the development of an electrical field across the dispersed liquid crystal material. De-ionized photographic gelatin reduces the ionic content of gelatin to operable levels. Ions in the binder can migrate in the presence of an electrical field on red reflecting cholesteric 34, green reflecting cholesteric 36 and blue reflecting cholesteric 38.

Figure 3:
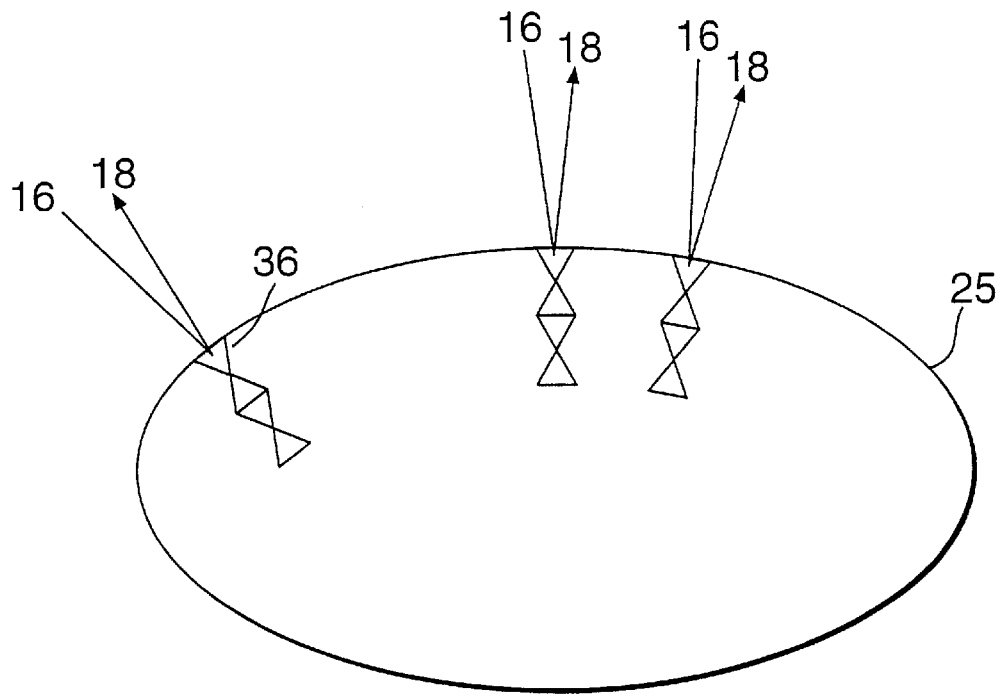
FIG. 3 is a sectional view of a domain containing chiral nematic liquid crystal material.

FIG. 3 is a cross section through a domain 25 containing a cholesteric material. Domain 25 is spherical, and cholesteric materials anchor on the surface of the domain. Because the surface of domain is spherical, incident light 16 from any angle of observation is reflected. The result is that these polymer dispersed (cholesteric) liquid crystals (PDLC) have good off-axis reflectivity.

Figure 1B:
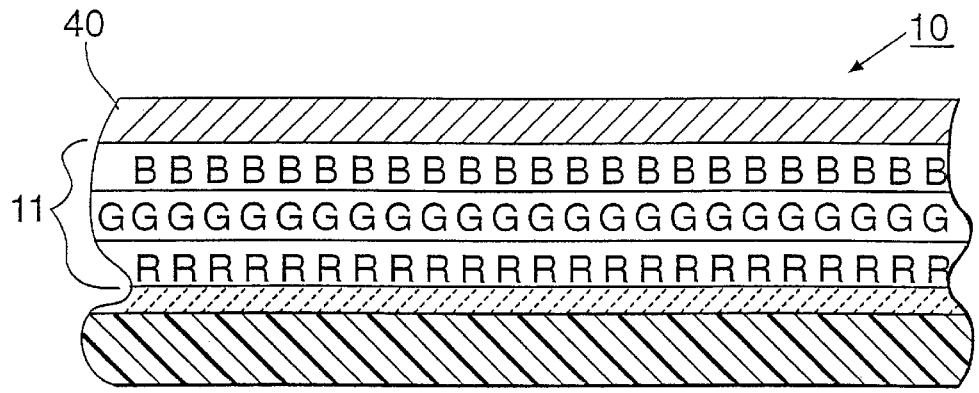
FIG. 1B is a sectional view of the sheet in FIG. 1A having a conductive layer.

In FIG. 1B, a second conductive layer 40 is formed over light modulating layers 11. Other commonly used materials and processes can be used to provide a vacuum deposited coat to second conductive layer 40. In a vacuum environment, materials such as Aluminum, Tin, Silver, Platinum, carbon, Tungsten, Molybdenum, Tin or Indium can be used. Oxides of the metals can be used to darken second conductive layer 40. The metal material can be excited by energy from resistance heating, cathodic arc, electron beam, sputtering or magnetron excitation. Use of Tin-Oxide or Indium-Tin Oxide in the layer permits layers of second conductive layer 40 that are transparent. An ITO layer can be sputtered over light modulating layers 11 to less than 250 ohms per square of resistance and over 80% light transmission.

Figure 1C:
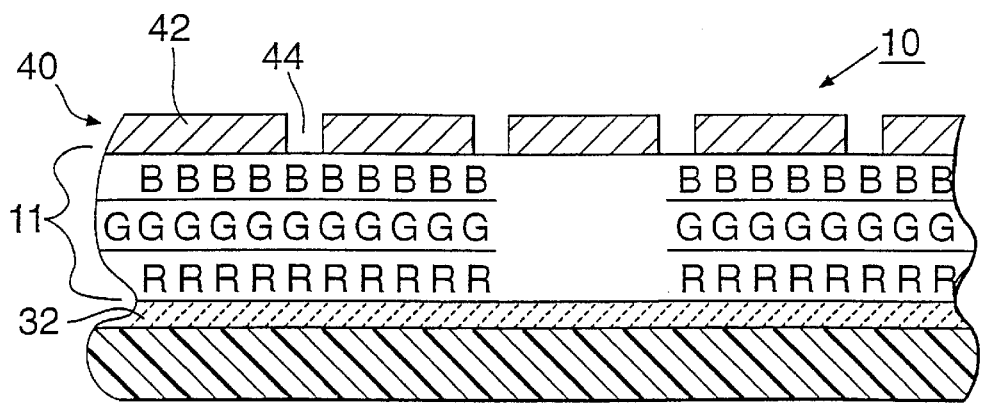
FIG. 1C is a sectional view of the sheet of FIG. 1B having a scribed pattern in the conductive layer.

FIG. 1C is a sectional view through the sheet 10 after laser processing. The laser removes portions of second conductive layer 40 to create non-conducting areas 44. Remaining portions of second conductive layer 40 form conductive areas 42 which can appear black, having an optical density of greater than 2.0 D or be nearly transparent. Nominally conductive metal in non-conductive areas 44 has been removed using a Ytterium-Aluminum Garnet (YAG) laser to define the extent of conductive areas 42. Non-conductive areas 44 are typically gaps approximately 2–5 microns wide that separate conductive areas 42. The YAG laser can generate patterns in second conductive layer 40 for both opaque and transmissive layers of materials. Alternatively, a light sensitive, metal forming layer can be used to create conductive areas 42 and non-conductive areas 44. A material such as silver halide can be light patterned and developed with nucleated silver ions to create a light absorbing, electrically conductive layer.

The transparent, electrically conductive layer 32 provides a continuous electrode for light modulating layers 11. An electrical field across conductive areas 42 and transparent, electrically conductive layer 32 operate on all of light modulating layers 11 to permit selective reflection or transmission of light through sheet 10.

Figure 4:
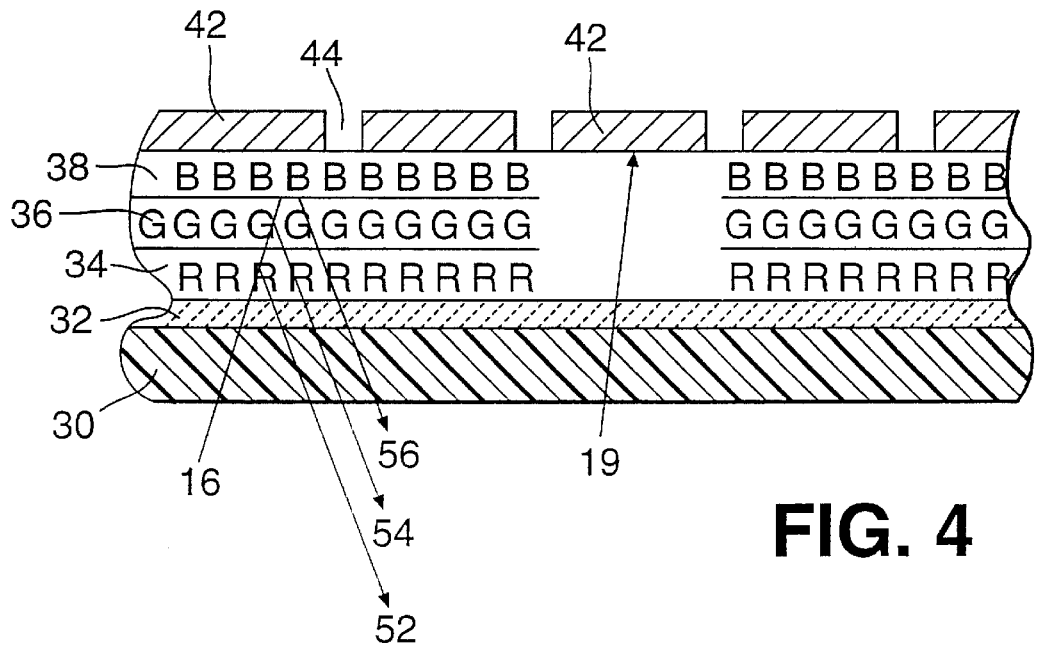
FIG. 4 is a sectional view of a sheet having three layers of dispersed chiral nematic liquid crystals.

Turning to FIG. 4, incident light 16 passes through transparent substrate 30 and transparent, electrically conductive layer 32. In the diagram, red reflecting cholesteric 34, green reflecting cholesteric 36 and blue reflecting cholesteric 38 have been written into the reflective, planar state. When incident light 16 passes through red reflecting cholesteric 34, red light is reflected from red reflecting cholesteric 34 as red reflected light 52. Incident light 16, minus red reflected light 52, then passes subsequent layers. When incident light 16 passes through subsequent layers, further portions of the visible spectrum are reflected. The reflectivity of the layers is adjusted to create a neutral density reflection which appears as white or grey. The multi-layer structure is simultaneously written when a field is applied between conductive areas 42 and transparent, electrically conductive layer 32. If the materials are fully driven into the focal-conic state, all wavelengths of light can pass through sheet 10. If conductive areas 42 are absorptive, then incident light 16 becomes absorbed light 19 and the sheet appears black.

Figure 5:
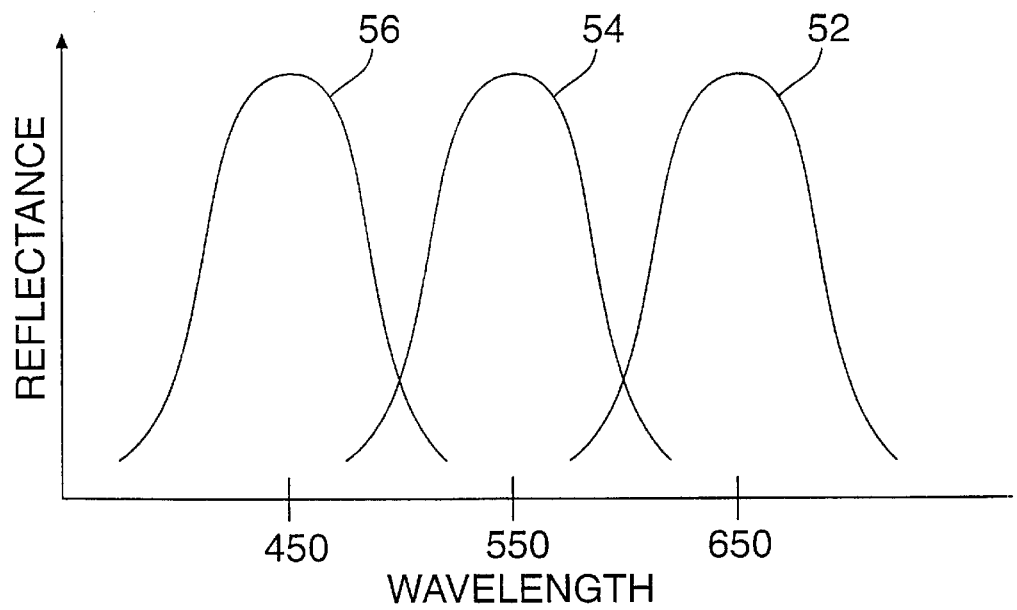
FIG. 5 is the spectral reflection of the sheet in FIG. 4.

FIG. 5 is a plot of the reflectivity of sheet 10 in the planar state as a function of wavelength. Each of the three reflective layers acts on a component of visible light to create a neutral density. Red reflecting cholesteric 34 creates the peak of red reflected light 52. Green reflecting cholesteric 36 creates the peak of green reflected light 54. Blue reflecting cholesteric 38 creates the peak of blue reflected light 56. Combined, the three layers form a neutral density.

If second conductive layer 40 is formed of a transparent material, sheet 10 acts as a neutral filter to block light in the planar state and appears transparent in the fully evolved focal-conic state. An un-patterned sheet 10 can serve as a privacy window that can selectively block or transmit light. Such a sheet provides a neutral density privacy screen that can be momentarily written and maintain state in the absence of an electrical field.

Figure 6:
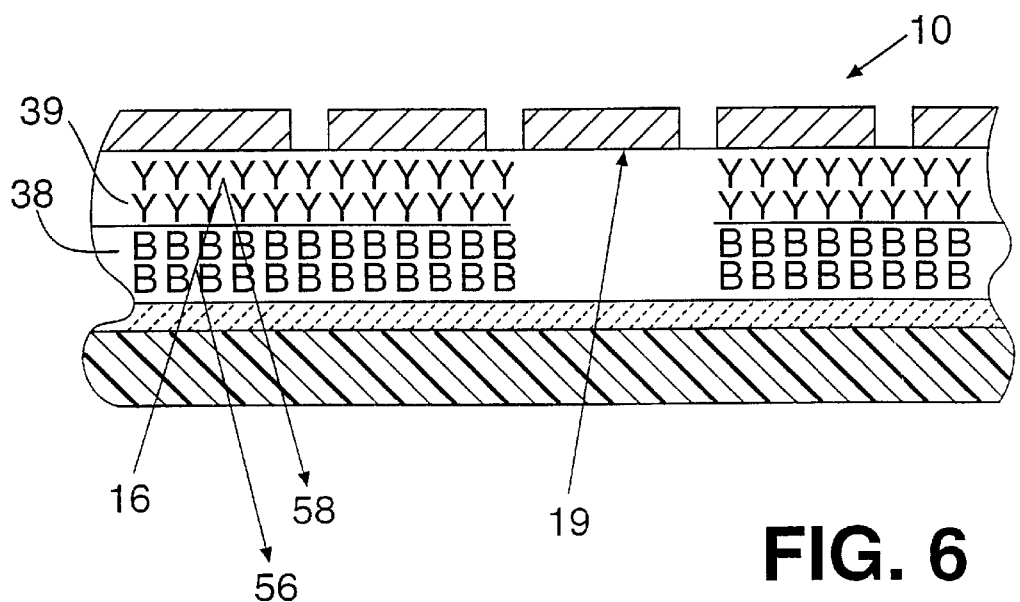
FIG. 6 is a sectional view of a sheet having two layers of dispersed chiral nematic liquid crystals.

FIG. 6 is an alternative embodiment of the current invention. Light modulating layers 11 is two layers of polymer stabilized cholesteric material instead of three layers. Cholesteric materials have a range of reflection, and in this embodiment, two materials are used, blue reflecting cholesteric 38 and yellow reflecting cholesteric 39. Blue reflecting cholesteric 38 is a nematic liquid crystal with a concentration of chiral dopant to create a greenish blue at about 490 nanometers.

In FIG. 6, blue reflecting cholesteric 38 and yellow reflecting cholesteric 39 have been written into the reflective, planar state. When incident light 16 passes through blue reflecting cholesteric 38, blue light is reflected from blue reflecting cholesteric 38 as blue reflected light 56. The shift in peak wavelength towards green causes some green light to be reflected. Incident light 16, minus blue reflected light 56, then passes subsequent layers. When incident light 16 passes through yellow reflecting cholesteric 39, much of both the red and green components of incident light 16 are reflected from yellow reflecting cholesteric 39 as yellow reflected light 58. The reflectivity of the layers is adjusted to create a neutral density reflection, appearing white or gray. The multi-layer structure shares a common field between conductive areas 42 and transparent, electrically conductive layer 32. When the materials are fully driven into the focal-conic state, all wavelengths of light can pass through sheet 10. If conductive areas 42 are absorptive, then incident light 16 becomes absorbed light 39 and sheet 10 appears to be black.

Figure 7:
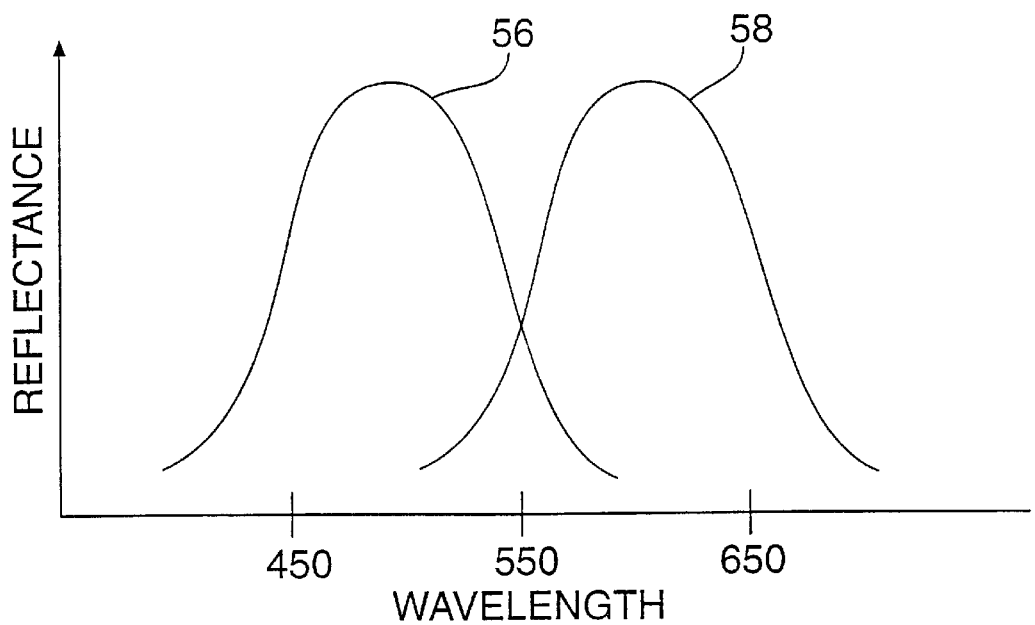
FIG. 7 is the spectral reflection of the sheet in FIG. 6.

FIG. 7 is a plot of the reflectivity of sheet 10 as a function of wavelength. Each of the two reflective layers acts on a component of visible light to create a neutral density. Blue reflecting cholesteric 38 creates the peak of blue reflected light 56 with some additional reflection of green light due to the shift in peak reflectance. Yellow reflecting cholesteric 39 creates the peak of yellow reflected light 58. The peak reflection of yellow reflecting cholesteric 39 and portions of both the green and red colors of incident light 16 are reflected. Combined, the two layers form a neutral density.

The invention has been described in detail with particular reference to certain preferred embodiments thereof, but it will be understood that variations and modifications can be effected within the spirit and scope of the invention.

PARTS LIST 10 sheet
11 light modulating layers
12 planar liquid crystals
14 focal-conic liquid crystals
16 incident light
18 reflected light
19 absorbed light
20 light absorber
25 domain
30 substrate
32 transparent, electrically conductive layer
34 red reflecting cholesteric
36 green reflecting cholesteric
38 blue reflecting cholesteric
39 yellow reflecting cholesteric
40 second conductive layer
42 conductive areas
44 non-conductive area
52 red reflected light
54 green reflected light
56 blue reflected light
58 yellow reflected light

What is claimed is:

1. A multi-layer, neutral-density sheet with memory properties, comprising:

(a) a transparent substrate;

(b) a transparent, electrically conductive layer formed over the transparent substrate; and (c) a plurality of light modulating layers formed over the transparent electrically conductive layer, each light modulating layer being formed of polymer with a dispersion of cholesteric liquid crystal material having memory properties, wherein the concentrations of cholesteric liquid crystal material in each layer and the thickness of each layer combine to produce a neutral density reflective layer in the planar state.

2. The multi-layer, neutral-density sheet according to claim 1, further including a conductive layer formed over the plurality of light modulating layers and responsive to an electric field produced between the conductive layer and the transparent, conductive substrate to cause the sheet to change between the neutral density state and the second transparent state.

3. The multi-layer, neutral-density sheet of claim 1 wherein the conductive layer is substantially transparent.

4. The multi-layer, neutral-density layer sheet of claim 1 wherein the conductive layer is substantially opaque and is patterned to have areas to block light when the plurality of light modulating layers are in the second transparent state.

5. The multi-layer, neutral density sheet of claim 1, wherein each of the plurality of light modulating layers includes a photographic gelatin containing the cholesteric liquid crystal.

6. The multi-layer, neutral-density sheet of claim 5 wherein the gelatin is deionized photographic gelatin.

7. The multi-layer, neutral-density layer sheet of claim 1, wherein the conductive layer is substantially opaque and is unpatterned and is a neutral density privacy screen that selectively blocks or transmits light.

8. The multi-layer, neutral-density layer sheet of claim 7, wherein the privacy screen can be momentarily written and maintain state in the absence of electrical field.

9. A multi-layer, neutral-density sheet with memory properties, comprising:
 (a) a transparent substrate;
 (b) a transparent, electrically conductive layer formed over the transparent substrate;
 (c) a plurality of light modulating layers formed over the transparent electrically conductive layer, each light modulating layer being formed of polymer with a dispersion of cholesteric liquid crystal material having memory properties, and
 (d) an electrically conductive layer overlying the plurality of light modulating layers,
  wherein the concentrations of cholesteric liquid crystal material in each layer and the thickness of each layer combine to produce a neutral density reflective layer in the planar state and wherein the plurality of layers is written when a field is applied between the transparent electrically conductive layer (b) and the electrically conductive layer (d).

* * * * *